United States Patent
Agarwal et al.

(10) Patent No.: US 10,296,123 B2
(45) Date of Patent: May 21, 2019

(54) REDUCING NOISE IN A FORCE SIGNAL IN AN ELECTRONIC DEVICE

(71) Applicant: Apple Inc., Cupertino, CA (US)

(72) Inventors: Manu Agarwal, Cupertino, CA (US); John Stephen Smith, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 540 days.

(21) Appl. No.: 14/716,659

(22) Filed: May 19, 2015

(65) Prior Publication Data
US 2016/0259465 A1    Sep. 8, 2016

Related U.S. Application Data

(60) Provisional application No. 62/129,634, filed on Mar. 6, 2015.

(51) Int. Cl.
*G06F 3/041*    (2006.01)
*G06F 3/044*    (2006.01)

(52) U.S. Cl.
CPC .......... *G06F 3/0414* (2013.01); *G06F 3/0418* (2013.01); *G06F 2203/04106* (2013.01)

(58) Field of Classification Search
CPC ................ G06F 3/0414; G06F 3/0418; G06F 2203/04106
See application file for complete search history.

(56) References Cited

U.S. PATENT DOCUMENTS

| | | | |
|---|---|---|---|
| 5,142,912 A | 9/1992 | Frische | |
| 5,345,807 A | 9/1994 | Butts et al. | |
| 5,552,568 A * | 9/1996 | Onodaka | G06F 3/0412 178/18.03 |
| 5,905,430 A | 5/1999 | Yoshino | |
| 5,911,158 A * | 6/1999 | Henderson | G01L 1/16 310/328 |
| 6,069,417 A | 5/2000 | Yuan | |
| 6,099,476 A | 8/2000 | Engel | |
| 6,130,517 A | 10/2000 | Yuan | |
| 6,788,050 B2 | 9/2004 | Gotkis | |

(Continued)

FOREIGN PATENT DOCUMENTS

| | | |
|---|---|---|
| CN | 1496549 | 5/2004 |
| CN | 102236463 | 11/2011 |

(Continued)

OTHER PUBLICATIONS

U.S. Appl. No. 14/137,705, filed Dec. 20, 2013, Agarwal et al.

(Continued)

*Primary Examiner* — Benyam Ketema
(74) *Attorney, Agent, or Firm* — Brownstein Hyatt Farber Schreck, LLP

(57) ABSTRACT

A force sensing device can be included in a display. Noise produced by various sources can be injected into the force signals produced by the force sensing device. Example noise sources include, but are not limited to, the display, Johnson or Thermal noise from the force sensing device, system noise, and magnetically-coupled or background noise produced by ambient light sources. A sampling scheme that includes one or more noise cancelling techniques can be employed to reduce the amount of noise in the force signals.

17 Claims, 9 Drawing Sheets

(56) References Cited

U.S. PATENT DOCUMENTS

| | | |
|---|---|---|
| 6,998,545 B2 | 2/2006 | Harkcom et al. |
| 7,046,496 B2 | 5/2006 | Hsin |
| 7,084,933 B2 | 8/2006 | Oh et al. |
| 7,451,050 B2 | 11/2008 | Hargreaves |
| 7,463,987 B2 | 12/2008 | Cech et al. |
| 7,536,918 B2 | 5/2009 | Rankin et al. |
| 7,543,501 B2 | 6/2009 | Cottles et al. |
| 7,683,634 B2 | 3/2010 | Hoen |
| 7,688,308 B2 | 3/2010 | Inokuchi |
| 7,825,903 B2 | 11/2010 | Anastas et al. |
| 8,289,290 B2 | 10/2012 | Klinghult |
| 8,290,602 B2 | 10/2012 | Begey et al. |
| 8,305,358 B2 * | 11/2012 | Klinghult ............ G06F 3/0414 178/18.05 |
| 8,436,809 B2 | 5/2013 | Sohn et al. |
| 8,547,114 B2 | 10/2013 | Kremin |
| 8,547,118 B1 | 10/2013 | Vojjala |
| 8,547,350 B2 | 10/2013 | Anglin et al. |
| 8,599,165 B2 | 12/2013 | Westhues et al. |
| 8,622,923 B2 | 1/2014 | Pons et al. |
| 8,669,960 B2 | 3/2014 | Murphy et al. |
| 8,760,248 B2 | 6/2014 | Marie |
| 8,917,198 B2 | 12/2014 | Pagnanelli |
| 8,976,137 B2 | 3/2015 | Goo et al. |
| 8,982,310 B2 | 3/2015 | Roudbari et al. |
| 9,000,967 B2 | 4/2015 | Pagnanelli |
| 9,013,414 B2 | 4/2015 | Kung et al. |
| 9,052,250 B1 | 6/2015 | Parker et al. |
| 9,063,627 B2 | 6/2015 | Yairi et al. |
| 9,104,267 B2 | 8/2015 | Choi |
| 9,105,255 B2 | 8/2015 | Brown et al. |
| 9,268,432 B2 | 2/2016 | Guo |
| 9,274,660 B2 | 3/2016 | Bernstein et al. |
| 9,310,950 B2 | 4/2016 | Takano et al. |
| 9,373,993 B2 | 6/2016 | Irwin |
| 9,389,686 B2 | 7/2016 | Zoller et al. |
| 9,389,727 B2 | 7/2016 | Woolley |
| 9,411,454 B2 | 8/2016 | Fujioka et al. |
| 9,483,146 B2 | 11/2016 | Davidson et al. |
| 9,495,056 B2 | 11/2016 | Takeda |
| 9,726,922 B1 | 8/2017 | Agarwal et al. |
| 9,726,933 B2 | 8/2017 | Agarwal et al. |
| 9,727,168 B2 | 8/2017 | Fuller |
| 9,830,025 B2 | 11/2017 | Han |
| 9,891,738 B2 | 2/2018 | Huppi et al. |
| 2004/0100007 A1 | 5/2004 | Engwall et al. |
| 2007/0268246 A1 | 11/2007 | Hyatt |
| 2008/0011091 A1 | 1/2008 | Weldon |
| 2008/0289887 A1 | 11/2008 | Flint et al. |
| 2009/0028321 A1 | 1/2009 | Cheng |
| 2010/0005851 A1 | 1/2010 | Cottles et al. |
| 2010/0053116 A1 * | 3/2010 | Daverman ............ G06F 3/0414 345/175 |
| 2010/0123686 A1 | 5/2010 | Klinghult et al. |
| 2010/0309146 A1 | 12/2010 | Lee et al. |
| 2011/0227872 A1 | 9/2011 | Huska et al. |
| 2012/0038577 A1 | 2/2012 | Brown et al. |
| 2012/0062244 A1 * | 3/2012 | Santana ................ G01D 5/24 324/658 |
| 2012/0319827 A1 | 12/2012 | Pance et al. |
| 2013/0009905 A1 * | 1/2013 | Castillo ................ G06F 3/044 345/174 |
| 2013/0127756 A1 | 5/2013 | Wang et al. |
| 2013/0285970 A1 * | 10/2013 | Ahn ...................... G06F 3/044 345/173 |
| 2014/0142395 A1 | 5/2014 | Sattler et al. |
| 2014/0176485 A1 | 6/2014 | Holmberg et al. |
| 2014/0298884 A1 | 10/2014 | Mindlin et al. |
| 2015/0103961 A1 | 4/2015 | Malipatil et al. |
| 2015/0160783 A1 | 6/2015 | Kaneko et al. |
| 2015/0331517 A1 * | 11/2015 | Filiz .................... G06F 3/0414 345/173 |
| 2015/0371608 A1 | 12/2015 | Yamaguchi et al. |
| 2016/0179200 A1 | 6/2016 | Billington et al. |
| 2016/0179243 A1 | 6/2016 | Schwartz |
| 2016/0209441 A1 | 7/2016 | Mazzeo et al. |
| 2016/0216833 A1 | 7/2016 | Butler et al. |
| 2016/0259411 A1 | 9/2016 | Yoneoka et al. |
| 2017/0017346 A1 | 1/2017 | Gowreesunker et al. |
| 2017/0052622 A1 | 2/2017 | Smith |
| 2017/0090667 A1 | 3/2017 | Abdollahian et al. |
| 2017/0147102 A1 | 5/2017 | Wang et al. |
| 2017/0300146 A1 | 10/2017 | Han et al. |
| 2017/0308207 A1 | 10/2017 | Azumi et al. |
| 2017/0351368 A1 | 12/2017 | Agarwal et al. |
| 2018/0039367 A1 | 2/2018 | Suzuki et al. |

FOREIGN PATENT DOCUMENTS

| | | |
|---|---|---|
| CN | 102713805 | 10/2012 |
| CN | 103097990 | 5/2013 |
| EP | 0178590 | 8/1986 |
| EP | 1455264 | 8/2004 |
| WO | WO 10/055195 | 5/2010 |
| WO | WO 13/170099 | 11/2013 |
| WO | WO 13/188307 | 12/2013 |
| WO | WO 14/101943 | 7/2014 |
| WO | WO 15/080696 | 6/2015 |

OTHER PUBLICATIONS

Bau, et al., "TeslaTouch: Electrovibration for Touch Surfaces," UIST'10, Oct. 3-6, 2010, New York, New York USA, 10 pages.

Feist, "Samsung snags patent for new pressure sensitive touch-screens," posted on AndroidAuthority.com at URL: http://www.androidauthority.com/samsung-patent-pressure-sensitive-touchscreens-354860, Mar. 7, 2014, 1 page.

* cited by examiner

REDUCING NOISE IN A FORCE SIGNAL IN AN ELECTRONIC DEVICE

CROSS-REFERENCE TO RELATED APPLICATION

This application claims the benefit under 35 U.S.C. § 119(e) of U.S. Provisional Patent Application No. 62/129,634, filed Mar. 6, 2015, entitled "Reducing Noise in a Force Signal in an Electronic Device," the entirety of which is incorporated herein by reference as if fully disclosed herein.

TECHNICAL FIELD

Embodiments described herein generally relate to force sensing, and in particular to techniques for reducing noise in a force signal produced by a strain sensing element in an electronic device.

BACKGROUND

Many electronic and input devices include a touch-sensitive surface for receiving user inputs. Devices such as smart telephones, tablet computing devices, laptop computers, track pads, wearable communication and health devices, navigation devices, and kiosks can include a touch-sensitive surface. In some cases, the touch sensitive surface is integrated with a display to form a touch-screen or touch-sensitive display.

The touch-sensitive surface may detect and relay the location of one or more user touches, which may be interpreted by the electronic device as a command or a gesture. In one example, the touch input may be used to interact with a graphical user interface presented on the display of the device. In another example, the touch input may be relayed to an application program operating on a computer system to affect changes to the application program.

Touch sensitive surfaces, however, are limited to providing only the location of one or more touch events. Moreover, touch, like many present inputs for computing devices, is binary. The touch is either present or it is not. Binary inputs are inherently limited insofar as they can only occupy two states (present or absent, on or off, and so on). In many examples, it may be advantageous to also detect and measure the force of a touch that is applied to a surface. In addition, if the force can be measured across a continuum of values, it can function as a non-binary input. Further, incorporating a touch sensing device and a force sensing device with the display of an electronic device may provide an enhanced user input for controlling an application or function of the electronic device as compared to using a touch sensor alone.

One challenge with incorporating a force sensing device into the display of an electronic device is that signals associated with the display and other components in the electronic device can introduce noise into the force signals produced by the force sensing device. The noise can cause errors in the force measurements. Additionally, the noise produced by the display and other components can overwhelm the force signals in that the magnitude of the noise can be much greater than the magnitude of the force signals, making it difficult to discern the force signals from the noise.

SUMMARY

A force sensing device can be incorporated into a display stack in an electronic device. The force sensing device can include a first set of individual strain sensitive films formed on a first surface of a substrate and a second set of individual strain sensitive films formed on a second surface of a substrate. Each strain sensitive film in the first set is aligned with a respective strain sensitive film in the second set. Two aligned strain sensitive films in the first and second sets together form a strain sensing element.

In certain situations, noise can be injected into a force signal when the force signal is sampled from one or more strain sensing elements. The noise can be generated by various sources within and outside of the electronic device. Example noise sources include, but are not limited to, the display, Johnson noise from the force sensing device, and magnetically-coupled or background noise produced by ambient AC power (operating at 60 Hz in the United States and 50 Hz in Europe), and noise due to a battery charging circuit. Embodiments of a sampling scheme are disclosed herein that can be employed to reduce or cancel the noise produced by one or more sources.

A single scanning period for a frame of the display may be divided into multiple subscan time periods, and the scanning operation for the frame is divided into multiple subscan operations. In some embodiments, a subscan operation occurs in each subscan time period. Thus, the subscan operations are repeated several times within the frame scanning time period. The subscan operations are performed only during a portion of a subscan time period. A delay period occurs between successive subscan operations. Thus, each subscan time period includes a delay period and a subscan time period.

In embodiments where the display includes a VCOM buffer layer, a VCOM signal may transition from a first level to a second level for touch sensing functions and transition from the second level to the first level for display functions. In some embodiments, signal instabilities may occur when the VCOM signal transitions between the touch sensing and the display functions ("touch-to-display handoff noise"). Some or all of the touch-to-display handoff noise may be injected into the force signals if the force signals are sampled during this time. Thus, in some embodiments, a delay period occurs during the time period the touch-to-display handoff noise is produced. The delay period can provide a sufficient settling time period prior to sampling the force signals. The delay time period is tunable or customizable in that any suitable time period can be used. The delay time period, which influences the start and stop times for the subscan operation in the subscan time period, may reduce or eliminate the amount of touch-to-display handoff noise that is injected into the force signals. In some embodiments, a delay time period can cause a subscan operation to be completely offset from the touch-to-display handoff noise. In other embodiments, a delay time period may reduce the amount of time a subscan operation overlaps the time in which the touch-to-display handoff noise is produced. In some embodiments, a signal instability produced by a VCOM signal transitioning between high and low signal levels can partially overlap with a scan period.

Additionally or alternatively, the time periods between every other subscan operation ("a subscan pair") can be selected to reduce or eliminate background noise. Background noise can be magnetically coupled noise from ambient light sources. For example, light sources in some countries, such as in the United States, operate at 60 Hz while in other countries (e.g., Europe) the light sources operate at 50 Hz. Thus, in some embodiments, a time period between subscan pairs can be selected to reduce or cancel the amount of background noise in the force signals.

Additionally or alternatively, the sampling scheme can reduce the Johnson noise produced by the strain sensing elements. The time period between successive subscan operations may be selected to allow the noise to continue integrating using one or more analog filtering elements. A capacitor is one non-limiting example of an analog filtering element, but other types of analog filtering elements can be used. The analog filtering element(s) may continue to operate when the analog signals are not being converted to digital signals. The noise can be averaged when multiple subscan operations are performed with delay periods between the subscan operations.

In some embodiments, system noise may be injected into the force signals. Circuits and components, along with subsystems, may be directly or indirectly involved in creating the system noise. For example, temperature changes due to dissipation in a battery or microprocessor may induce a Seebeck voltage offset in the sensor circuit. The magnetic field due to the current driving an audio device may contribute an electromotive force (EMF) in a sensor circuit. In another example, the magnetic field due to proximity of a moving magnet (such as that in a pair of headphones) may induce a changing EMF in a sensor circuit. In some embodiments, bias flipping can be used to cancel or reduce the system noise. Each strain sensing element receives a first reference voltage at a first node and a second reference voltage at a second node. The first and second reference voltages can alternately switch between the first and second nodes to reduce or cancel the amount of system noise injected into the force signals. In one non-limiting example, the first and second reference voltages flip in between the subscan operations. In another non-limiting example, the first and second reference voltages flip in between the full scan operations. Other embodiments can perform bias flipping in another suitable pattern or arrangement to cancel or reduce the system noise.

Additionally or alternatively, sense circuitry operably connected to the strain sensing elements can include a filter that can be configured to reduce or eliminate display line refresh noise. Since the frequencies of the display line refresh noise can be determined, a transfer function is selected for the filter to reduce or eliminate the display line refresh noise. In one non-limiting example, the sense circuitry can include an analog-to-digital converter with a windowing or decimation filter. The windowing or decimation filter can be configured to filter out the display line refresh noise or other noise sources that show a concentration of noise energy in one or multiple narrow band frequency bins or other types of tonality in the noise spectrum. The decimation filter attenuates high frequency noise, so a size of a step for one analog-to-digital conversion may be selected to produce sufficient attenuation at the frequency of the display line refresh noise.

BRIEF DESCRIPTION OF THE DRAWINGS

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

DETAILED DESCRIPTION

Embodiments described herein provide an electronic device that includes a display and multiple devices that each use or share at least a portion of the display area. By way of example only, the multiple devices can include a touch sensing device and a force sensing device. The touch and force sensing devices can each use at least a portion of the top surface of the display screen as an input region.

In some embodiments, noise produced by various sources can be injected into the force signals produced by the force sensing device. Example noise sources include, but are not limited to, the display, Johnson or Thermal noise from the force sensing device, and magnetically-coupled or background noise produced by ambient light sources (e.g., light sources operating at 60 Hz in the United States and 50 Hz in Europe). Various techniques are disclosed herein that reduce or cancel the noise in the force signals. A sampling scheme that includes one or more noise cancelling techniques can be employed to reduce or remove noise from the force signals. All of the noise cancelling techniques can be used together when sampling force measurements, or individual noise cancelling techniques can be used individually or in various combinations.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting. When used in conjunction with layers of a display or device, the directional terminology is intended to be construed broadly, and therefore should not be interpreted to preclude the presence of one or more intervening layers or other intervening features or elements. Thus, a given layer that is described as being formed, positioned, disposed on or over another layer, or that is described as being formed, positioned, disposed below or under another layer may be separated from the latter layer by one or more additional layers or elements.

Figure 1:
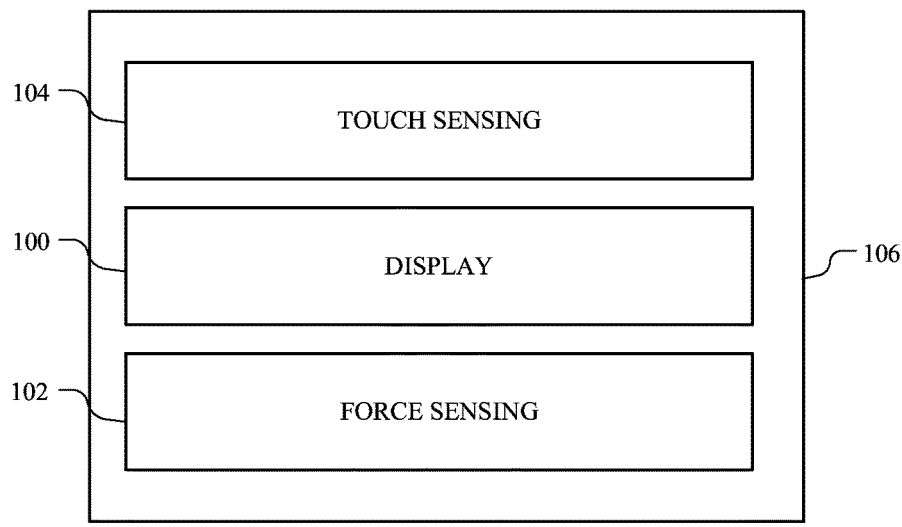
FIG. 1 is a conceptual view of a display screen that can be used to perform multiple functions.

Referring now to FIG. 1, there is shown a conceptual view of a display that can be used to perform multiple functions. The functions can include a display function 100, a force sensing function 102, and a touch sensing function 104. These functions can be performed in conjunction with the display 106. In other words, a user can interact with an image displayed on the display 106 with one or more touches, an applied force, or both touch and force. For example, a game that is displayed on the display 106 can receive touch inputs from a user. As another example, an application displayed on the display 106 can perform one function at one rate of speed when a user applies a small amount of force to the display and perform the function at a faster rate of speed when the user applies a greater amount of force to the display 106.

The touch sensing and force sensing functions can each use or share some or all of the display area. For example, in one embodiment, a user can interact with a displayed image by touching and/or by applying a force at an appropriate position on the display, with the appropriate position located anywhere on the display. In another embodiment, the display function 100 and the touch sensing function 104 can use the entire display 106 while the force sensing function 102 involves a portion of the display 106. Thus, each function can use some or all of the display 106 when in operation. The arrangement of the functions in FIG. 1 is for illustrative purposes only, and does not correspond to any layers or devices in the display or in an electronic device. Additionally, the arrangement of the functions does not correspond to the amount of area on the display used by each function.

Figure 2:
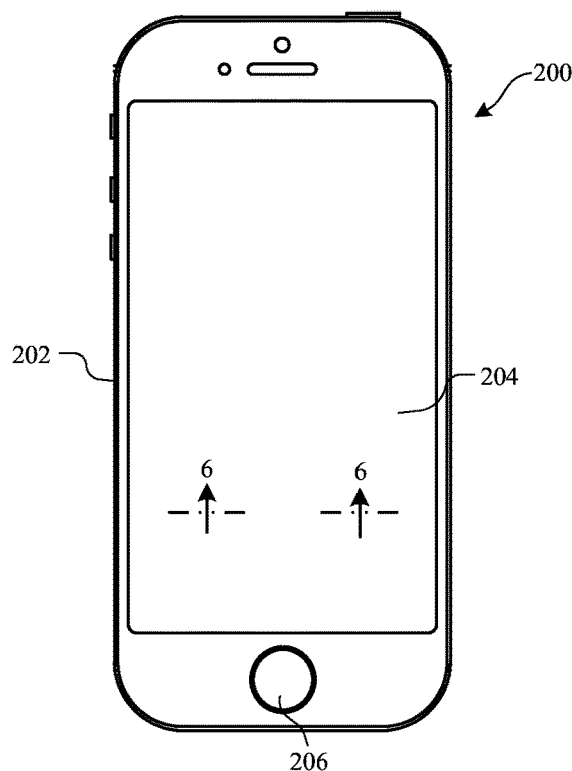
FIG. 2 depicts one example of an electronic device that can be configured to perform multiple functions with respect to a display.

FIG. 2 depicts one example of an electronic device that can be configured to perform multiple functions with respect to a display. In the illustrated embodiment, the electronic device 200 is implemented as a smart telephone. Other embodiments can implement the electronic device differently. For example, an electronic device can be a laptop computer, a tablet computing device, a wearable computing device, a digital music player, a display input device, a kiosk, a remote control device, a television, and other types of electronic devices that include a display.

The electronic device 200 includes an enclosure 202 surrounding a display 204 and one or more input/output devices 206 (shown as button 206). The enclosure 202 can form an outer surface or partial outer surface and protective case for the internal components of the electronic device 200, and may at least partially surround the display 204. The enclosure 202 can be formed of one or more components operably connected together, such as a front piece and a back piece. Alternatively, the enclosure 202 can be formed of a single piece operably connected to the display 204.

The display 204 can be implemented with any suitable display, including, but not limited to, a multi-touch sensing touchscreen device that uses liquid crystal display (LCD) technology, light emitting diode (LED) technology, organic light-emitting display (OLED) technology, or organic electro luminescence (OEL) technology.

In some embodiments, the button 206 can take the form of a home button, which may be a mechanical button, a soft button (e.g., a button that does not physically move but still accepts inputs), an icon or image on a display, and so on. Further, in some embodiments, the button 206 can be integrated as part of a cover glass of the electronic device. Although not shown in FIG. 2, the electronic device 200 can include other types of input/output devices, such as a microphone, a speaker, a camera, and one or more ports, such as a network communication port and/or a power cord port.

Figure 3:
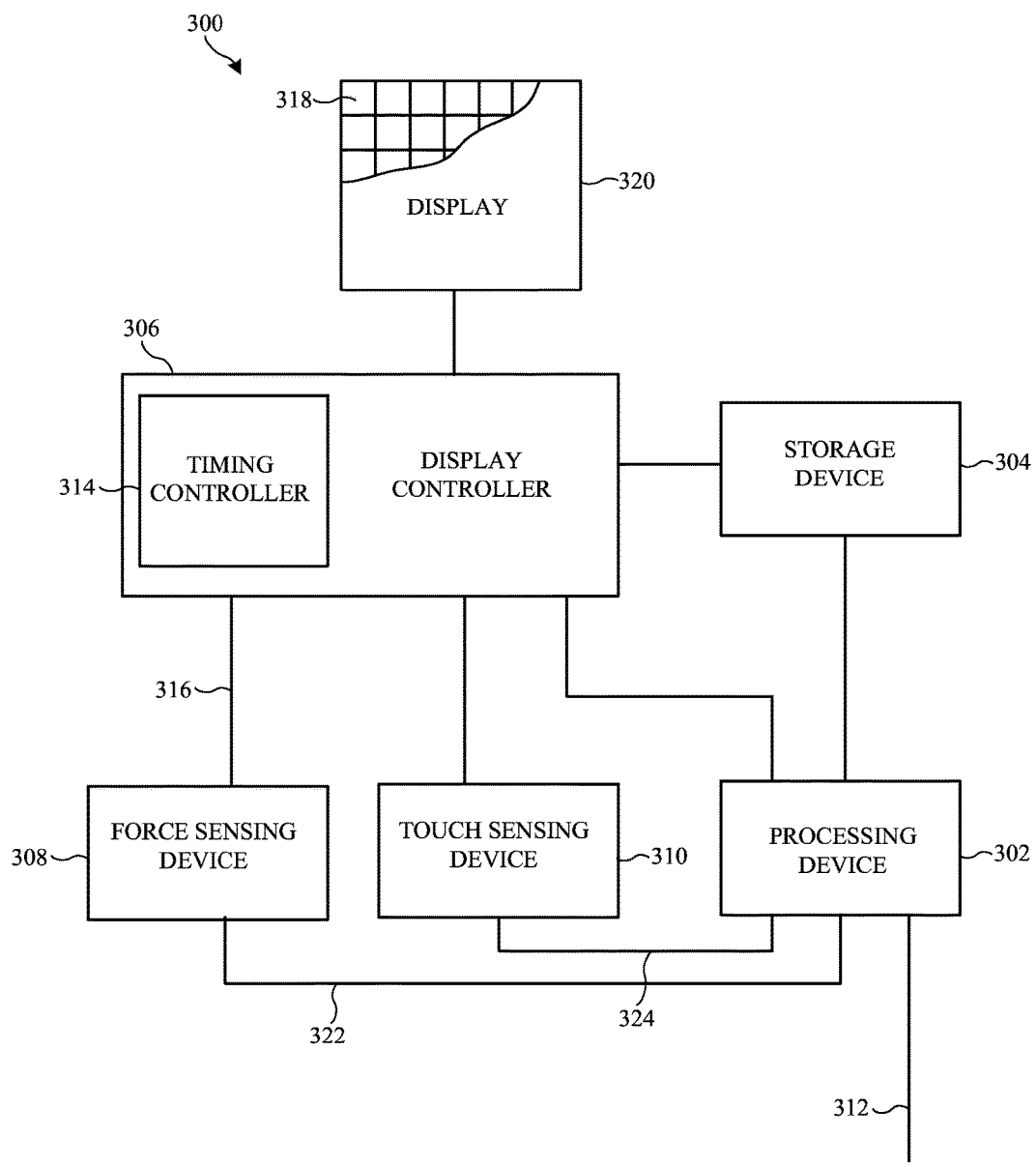
FIG. 3 is a block diagram of a system that includes a display, a force sensing device, and a touch sensing device.

Embodiments described herein perform a display operation, a touch sensing operation, and a force sensing operation in a display area or in one or more portions of a display area. FIG. 3 is an example block diagram of a system that includes a display 320, a force sensing device 308, and a touch sensing device 310. A processing device 302 is operably connected to a storage device 304, a display controller 306, the force sensing device 308, and the touch sensing device 310. Image data is received by the processing device 302 on signal line 312 and stored in the storage device 304. The processing device 302 can be implemented with one or more suitable data processing devices, examples of which include a microprocessor, an application-specific integrated circuit (ASIC), and a central processing unit (CPU). The storage device 304 can be configured as one or more memories, including, but not limited to, RAM, ROM, flash memory, and removable memory, or combinations thereof.

The display controller 306 can include a timing controller 314 that generates timing and control signals for the display 320, the force sensing device 308, and the touch sensing device 310. For example, the timing controller 314 and/or the display controller 306 can produce timing and control signals that control the sampling time periods and non-sampling time periods of the force and touch signals. The display controller 306 can be any suitable hardware, software, firmware, or combination thereof adapted to translate the image data into control signals for driving the pixels 318 of the display 320. The display controller 306 can include other suitable components, such as a processing device and/or a storage device.

The processing device 302 receives force signals from the force sensing device 308 on signal line 322. The processing device 302 determines an amount of force, or a change in force, applied to an input region of the force sensing device 308 based on at least one force signal. Additionally, the processing device 302 receives the touch signals from the touch sensing device 310 on signal line 324. The processing device 302 determines one or more touch locations on an input region of the touch sensing device 310 based on at least one touch signal. In some embodiments, the processing device 302 produces the timing and control signals that control the sampling time periods and non-sampling time periods of the force and touch signals.

It should be noted that FIGS. 2 and 3 are illustrative only. In other examples, an electronic device may include different, fewer, or more components than those shown in FIGS. 2 and 3.

The touch sensing device and the force sensing device can employ any suitable sensing technology. By way of example only, a force sensing device and a touch sensing device can use capacitive sensing technology, resistive sensing technology, piezoelectric or piezoresistive sensing technology, magnetic technology, optical technology, inductive technology, and ultrasonic sensing technology. In the embodiments described herein, the force sensing device is implemented as a force sensitive film that produces a signal or a change in a signal in response to strain. The signal is used to determine or estimate an amount of force applied to an input region. The one or more strain-sensitive films are configured as strain gauges that are formed with a piezoresistive material. Also in the embodiments described herein, the touch sensing device is implemented as a capacitive touch sensing device that determines a location of one or more touches applied to an input region through capacitance changes in one or more capacitive sensing elements. Other embodiments can use a different type of a force sensing device and/or touch sensing device, including, but not limited to, resistive, ultrasonic, thermal, capacitive, or piezoelectric devices.

Figure 4:
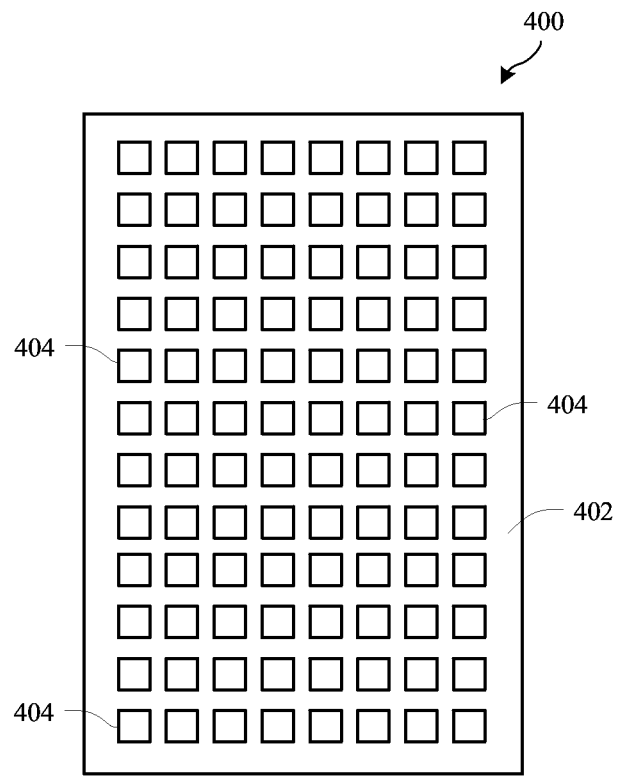
FIG. 4 illustrates a simplified plan view of an example strain-sensitive structure including a grid of optically transparent strain-sensitive films.

FIG. 4 depicts a plan view of an example strain-sensitive structure including a grid of optically transparent strain-sensitive films. The strain-sensitive structure 400 includes a substrate 402 with independent strain-sensitive films 404 formed in or on the substrate 402. The strain-sensitive films 404 are configured to detect strain based on an amount of force applied to an input region. In this example, the substrate 402 may be an optically transparent material, such as polyethylene terephthalate (PET). The strain-sensitive films 404 may be made from transparent conductive materials include, for example, polyethyleneioxythiophene (PEDOT), indium tin oxide (ITO), carbon nanotubes, graphene, silver nanowire, other metallic nanowires, and the like. In certain embodiments, the strain-sensitive films 404 may be selected at least in part on temperature characteristics. For example, the material selected for strain-sensitive films 404 may have a negative temperature coefficient of resistance such that, as temperature increases, the resistance decreases.

Figure 5:
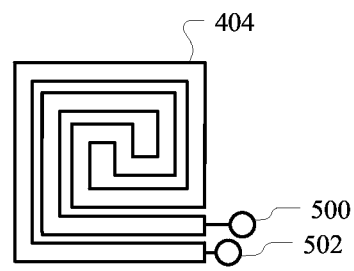
FIG. 5 depicts a plan view of one example of an optically transparent serpentine strain-sensitive film which may be used in the example strain-sensitive structure depicted in FIG. 4.

In this example, strain-sensitive films 404 are formed as an array of rectilinear sensing elements, although other shapes and array patterns can also be used. In many examples, each individual strain-sensitive film 404 may have a selected shape and/or pattern. For example, in certain embodiments, a strain-sensitive film 404 may be deposited in a serpentine pattern, such as the one shown in FIG. 5. The strain-sensitive film 404 may include at least two electrodes 500, 502 that are configured to be operably connected to sense circuitry. In other cases, a strain-sensitive film 404 may be electrically connected to sense circuitry without the use of electrodes. For example, a strain-sensitive film 404 may be connected to the sense circuitry using conductive traces that are formed as part of the film layer.

Figure 6:
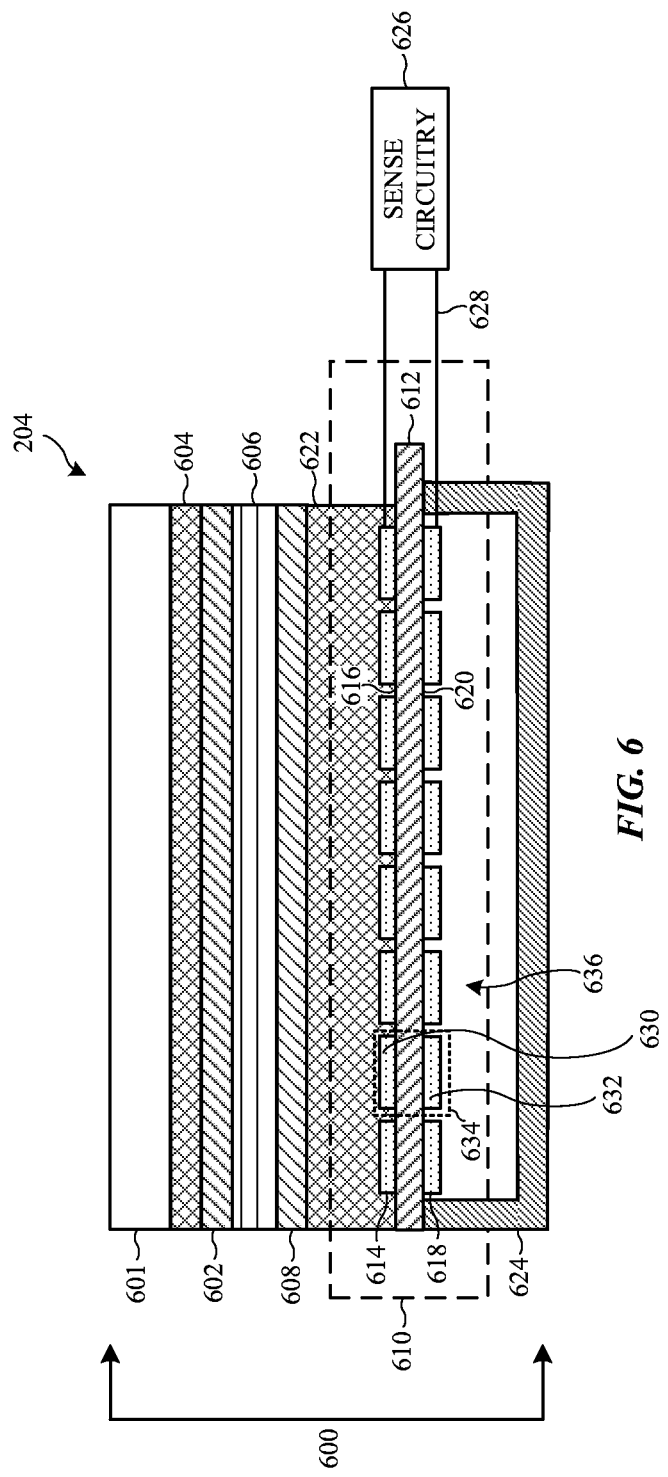
FIG. 6 is a cross-sectional view of a portion of the display 204 taken along line 6-6 in FIG. 2.

FIG. 6 depicts a cross-sectional view of the display 204 taken along line 6-6 in FIG. 2. The cross-sectional view illustrates a display stack 600 for the display 204. A cover glass 601 is positioned over a front polarizer 602. The cover glass 601 can be a flexible touchable surface that is made of any suitable material, such as, for example, a glass, a plastic, a sapphire, or combinations thereof. The cover glass 601 can act as an input region for a touch sensing device and a force sensing device by receiving touch and force inputs from a user. The user can touch the cover glass 601 with one or more fingers or with another element such as a stylus.

An adhesive layer 604 can be disposed between the cover glass 601 and the front polarizer 602. Any suitable adhesive can be used in adhesive layer, such as, for example, a liquid optically clear adhesive. A display layer 606 can be positioned below the front polarizer 602. As described previously, the display layer 606 may take a variety of forms, including a liquid crystal display (LCD), a light-emitting diode (LED) display, and an organic light-emitting diode (OLED) display. In some embodiments, the display layer 606 can be formed from glass or have a glass substrate. Embodiments described herein include a multi-touch touchscreen LCD display layer.

Additionally, the display layer 606 can include one or more layers. For example, a display layer 606 can include a VCOM buffer layer, a LCD display layer, and a conductive layer disposed over and/or under the display layer. In one embodiment, the conductive layer may comprise an indium tin oxide (ITO) layer.

A rear polarizer 608 may be positioned below the display layer 606, and a strain sensitive structure 610 below the rear polarizer 608. The strain-sensitive structure 610 includes a substrate 612 having a first set of independent strain-sensitive films 614 on a first surface 616 of the substrate 612 and a second set of independent strain-sensitive films 618 on a second surface 620 of the substrate 612. In the illustrated embodiment, the first and second surfaces 616, 620 are opposing top and bottom surfaces of the substrate 612, respectively. An adhesive layer 622 may attach the substrate 612 to the rear polarizer 608.

As described earlier, the strain-sensitive films may be formed as an array of rectilinear strain sensing elements. Each strain-sensitive film in the first set of independent strain-sensitive films 614 is aligned vertically with a respective one of the strain-sensitive films in the second set of independent strain-sensitive films 618. In many embodiments, each individual strain-sensitive film may take a selected shape. For example, in certain embodiments, the strain-sensitive film may be deposited in a serpentine pattern, similar to the serpentine pattern shown in FIG. 5.

A back light unit 624 can be disposed below the strain sensitive structure 610. The back light unit 624 may be configured to support one or more portions of the substrate 612 that do not include strain-sensitive films. For example, as shown in FIG. 6, the back light unit 624 can support the ends of the substrate 612. Other embodiments may configure a back light unit differently.

The strain-sensitive films are typically connected to sense circuitry 626 through conductive connectors 628. The sense circuitry 626 is configured to detect changes in an electrical property of each of the strain-sensitive films. In this example, the sense circuitry 626 may be configured to detect changes in the resistance of the strain-sensitive films, which can be used to estimate a force that is applied to the cover glass 601. In some embodiments, the sense circuitry 626 may also be configured to provide information about the location of a touch based on the relative difference in the change of resistance of the strain-sensitive films 614, 618.

Figure 7:
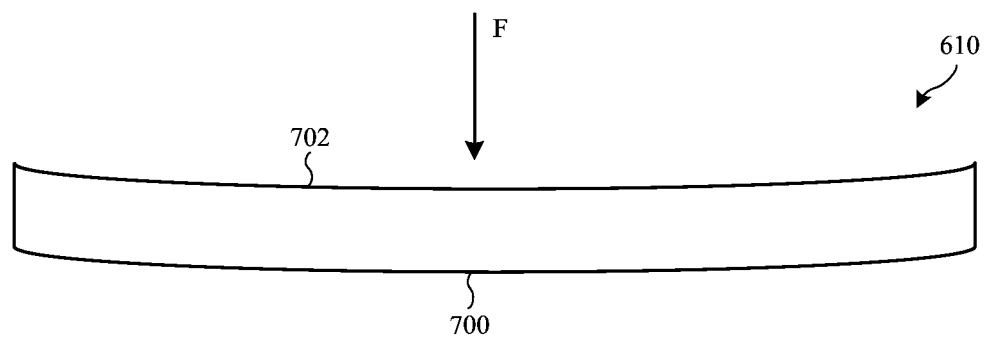
FIG. 7 is a simplified cross-sectional view of the strain sensing structure 610 responding to force.

For example, as discussed earlier, the strain sensitive films can be configured as strain gauges that are formed with a piezoresistive material. When a force is applied to an input region (e.g., the cover glass 601), the planar strain sensitive structure 610 is strained and the resistance of the piezoresistive material changes in proportion to the strain. As shown in FIG. 7, the force can cause the strain sensitive structure 610 to bend slightly. The bottom 700 of the strain sensitive structure elongates while the top 702 compresses. The strain gauges measure the elongation or compression of the surface, and these measurements can be correlated to the amount of force applied to the input region.

Two vertically aligned strain-sensitive films (e.g., 630 and 632) form a strain sensing element 634. The sense circuitry 626 may be adapted to determine a difference in an electrical property of each strain sensing element. For example, as described above, a force may be received at the cover glass 601, which in turn causes the strain sensitive structure 610 to bend. The sense circuitry 626 is configured to detect changes in an electrical property (e.g., resistance) of the one or more strain sensing elements, and these changes are correlated to the amount of force applied to the cover glass 601.

In the illustrated embodiment, a gap 636 exists between the strain sensitive structure 610 and the back light unit 624. Strain measurements intrinsically measure the force at a point on the top surface 616 of the substrate 612 plus the force from the bottom at that point on the bottom surface 620 of the substrate 612. When the gap 636 is present, there are no forces on the bottom surface 620. Thus, the forces on the top surface 616 can be measured independently of the forces on the bottom surface 620. In alternate embodiments, the strain sensitive structure 610 may be positioned above the display layer when the display stack 600 does not include the gap 636.

Figure 8:
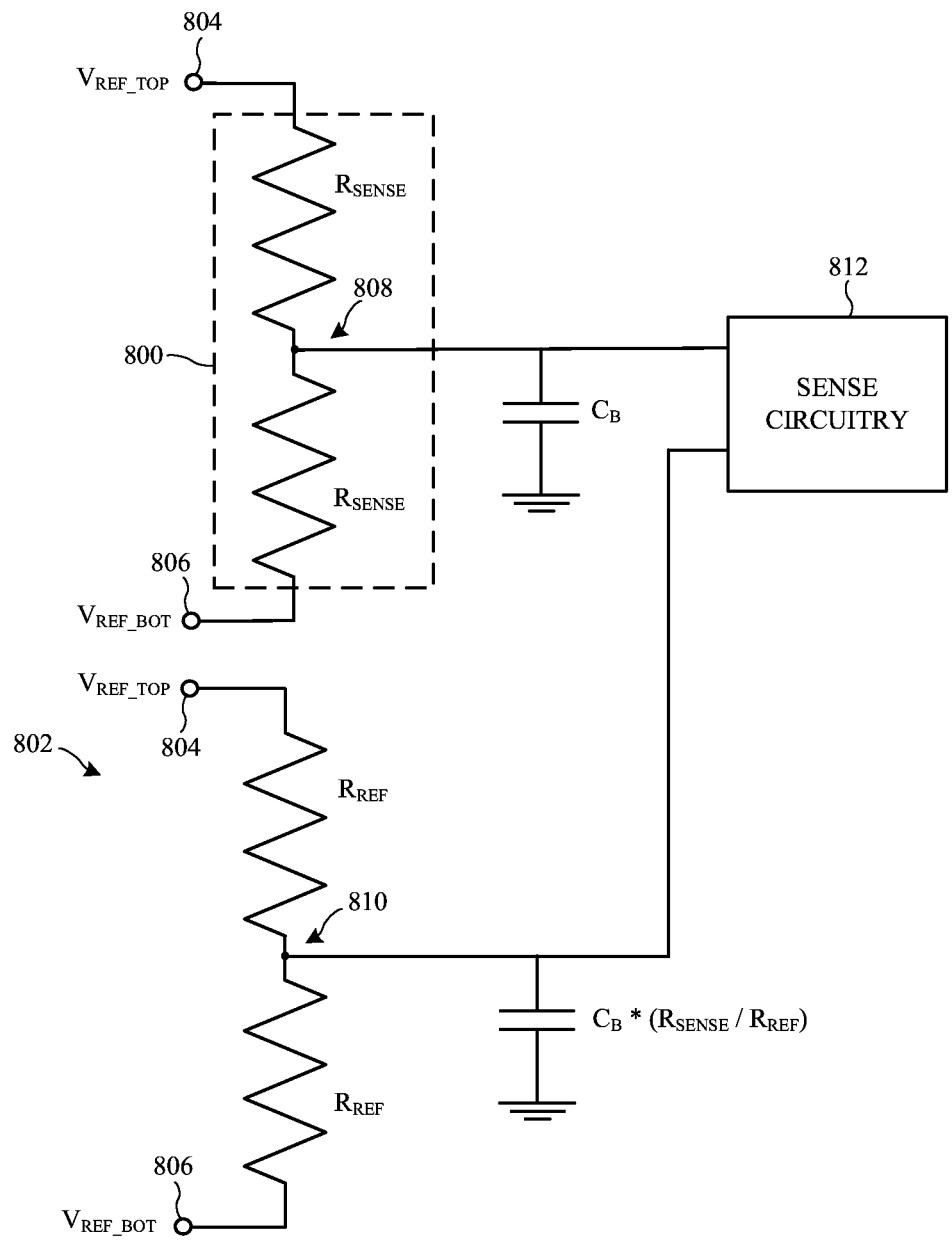
FIG. 8 is a simplified schematic diagram of sense circuitry operably connected to a strain sensing element.

Referring now to FIG. 8, there is shown a simplified schematic diagram of sense circuitry operably connected to a strain sensing element. The strain sensing element 800 that includes the two-vertically aligned strain-sensitive films can be modeled as two resistors $R_{SENSE}$ configured as a voltage divider. A reference voltage divider 802 includes two reference resistors $R_{REF}$. As one example, the strain sensing element 800 and the reference voltage divider 802 may be modeled as a Wheatstone bridge circuit, with the strain sensing element 800 forming a half bridge of the Wheatstone bridge circuit and the reference voltage divider forming the other half bridge of the Wheatstone bridge circuit. Other embodiments can model the strain sensing element and the reference resistors differently.

A first reference voltage ($V_{REF\_TOP}$) is received at node 804 and a second reference voltage ($V_{REF\_BOT}$) is received at node 806. A force signal at node 808 of the strain sensing element 800 and a reference signal at node 810 of the reference voltage divider 802 are received by the sense circuitry 812. The sense circuitry 812 is configured to detect changes in an electrical property (e.g., resistance) of the strain sensing element 800 based on the differences in the force and reference signals of the two voltage dividers. The changes can be correlated to the amount of force applied to the cover glass 601.

Figure 9:
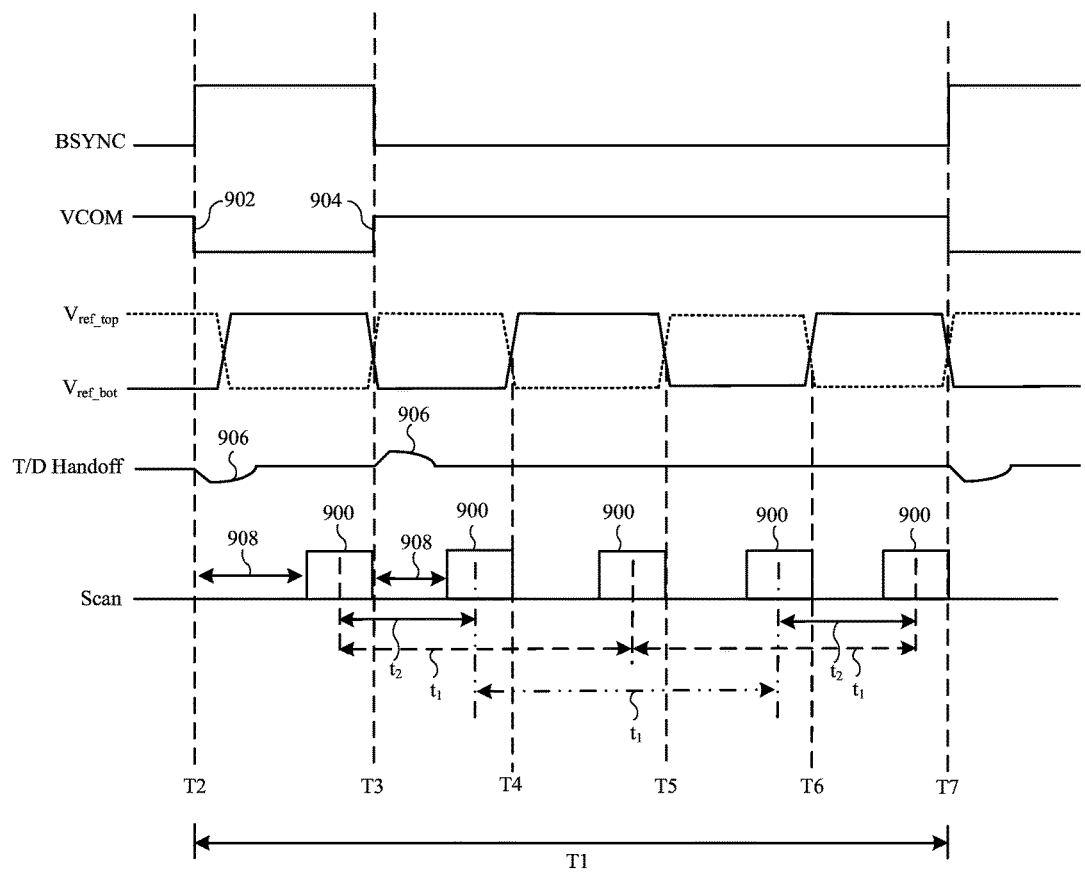
FIG. 9 illustrates one example of a timing diagram for a sampling scheme that is suitable for use with the strain-sensitive structure shown in FIG. 6.

FIG. 9 is one example of a timing diagram for a sampling scheme that is suitable for use with the strain-sensitive structure shown in FIG. 6. The sampling scheme can be implemented in a processing device or controller, such as in the display controller 306 shown in FIG. 3. The timing generator 314 can produce the timing and control signals that produce the illustrated timing diagram.

As described earlier, noise from several different sources can be injected into the force signal received from one or more strain sensing elements when the force signal is sampled. The noise sources include touch-to-display handoff noise, Johnson noise, background or magnetically-coupled noise from ambient light sources, general noise from the system, and display line refresh noise. The timing diagram shown in FIG. 9 provides a scanning scheme that can reduce or eliminate noise from some or all of these noise sources. Thus, the scanning scheme may be a unified noise cancelling scanning scheme when all of the noise cancelling techniques described below are employed. Other embodiments, however, are not limited to using all of the noise cancelling techniques in an electronic device. One or more of the noise cancelling techniques may be used in other embodiments.

In the illustrated embodiment, the time period T1 (time between T2 and T7) represents a single scanning period for a frame of the display (e.g., display 204). The time period T1 is divided into multiple subscan time periods T2 to T3, T3 to T4, T4 to T5, T5 to T6, and T6 to T7. Additionally, a scanning operation for the frame is divided into multiple subscan operations 900. As shown, a subscan operation 900 occurs in each subscan time period. Thus, the subscan operations 900 are repeated several times within the frame time period T1. In other embodiments, the subscan operations 900 can occur in select subscan time periods. In some embodiments, the subscan operations can subsequently be accumulated to introduce another level of filtering, as described below. The signals or values obtained during the subscan operations may or may not be weighted when accumulated.

Touch-to-Display Handoff Noise

The BSYNC signal is a system level synchronization signal. In one embodiment, touch sensing functions occur when the BSYNC signal is high and display functions occur when the BSYNC signal is low. In the illustrated embodiment, a VCOM signal is received by the VCOM plane in the display layer. The VCOM signal may transition from a first level (e.g., a high level) to a second level (e.g., a low level) for touch sensing functions (see 902), and transition from the second level to the first level for display functions (see 904). In some embodiments, signal instabilities may occur when the VCOM signal transitions between the touch sensing and the display functions ("touch-to-display handoffs"). For example, as shown in FIG. 9, noise 906 ("touch-to-display handoff noise") may be produced during the VCOM signal transitions, and some or all of this noise 906 can be injected into the force signals if the force signals are sampled during this time. Thus, in some embodiments, a delay period 908 may occur before a subscan operation 900. The delay period 908 can provide a sufficient settling time period prior to sampling the force signals.

Each delay time period 908 is tunable or customizable in that any suitable time period can be used. Additionally, the delay time periods 908 can be the same amount of time, or some delay time periods can have a different amount of time compared to other delay time periods. The delay time periods, which influence the start and stop times for the subscan operations 900, may reduce or eliminate the amount of touch-to-display handoff noise 906 that is injected into the force signals. In some embodiments, a delay time period 908 can cause a subscan operation 900 to be completely offset from the touch-to-display handoff noise 906. In other embodiments, a delay time period 908 may reduce the amount of time a subscan operation 900 overlaps the time period in which the touch-to-display handoff noise 906 is produced. In other words, the delay time period can reduce the amount of time a subscan operation 900 and the touch-to-display handoff noise 906 occur simultaneously.

Background Noise

Additionally or alternatively, the time periods between every other subscan operation 900 ("a subscan pair") can be selected to reduce or eliminate background noise. As described earlier, the background noise can be magnetically coupled noise from ambient light sources. For example, light sources in some countries, such as in the United States operate at 60 Hz while in other countries (e.g., Europe) the light sources operate at 50 Hz. Thus, in some embodiments, the time period $t_1$ between subscan pairs can be selected to reduce or cancel the amount of background noise that is injected into the force signals. For example, in one embodiment with a 16 Hz frame time period, noise from a 60 Hz light source can be cancelled out when the time period $t_1$ is 8.33 ms. In other embodiments, other types of noise may be cancelled out with an appropriate amount of time for time period $t_1$. For example, the time period $t_1$ can be set to an appropriate amount of time (e.g., 10 ms) to cancel the noise from 50 Hz light sources.

In some embodiments, the time period $t_2$ between successive subscan operations can assist in noise cancellation. For example, the time period $t_1$ can be set to cancel noise at one frequency band while the time period $t_2$ may be set to cancel noise at different second frequency band. In other words, the time periods $t_1$ and $t_2$ can be set for multiple frequency domain filter notches. The time periods $t_1$ and $t_2$ may be used to implement various kinds of Finite Impulse Response (FIR) filters that can be programmed to attain certain filter characteristics. As one non-limiting example, the time period $t_1$ can be set to 8.33 ms to cancel out 60 Hz noise and the time period $t_2$ may be set to 3.5 ms to cancel out 143 Hz noise.

Additionally or alternatively, the time periods $t_1$ and $t_2$ can be set to avoid system interferences in the time domain. For example, the time period $t_1$ may be set to not perform a scan operation when disturbances, such as touch-to-display hand-off noise occurs.

Johnson Noise

Additionally, performing a subscan operation 900 only during a portion of a subscan time period may reduce or eliminate the effect of Johnson noise while improving or optimizing circuit power consumption. In certain embodiments, Johnson noise may be the dominant noise source due to the relatively high resistance of the strain sensitive films. In one embodiment, the integration bandwidth of the Johnson noise can be controlled by an analog filtering component, such as the capacitor $C_B$ in FIG. 8. Depending on the selection of the delay time periods 908 and a sufficiently large value of capacitance for $C_B$, the Johnson noise may average for a longer period of time than the period of time the sense circuitry is operating (e.g., the ADC 1014 in FIG. 10), which reduces power consumption. In other words, less power is consumed by sampling the force signals only during the multiple subscan operations compared to sampling the force signals for an entire frame scanning period T1. The delay period 908 reduces the amount of power consumed during each subscan time period. This technique may be especially useful in a multiplexed ADC system (see e.g., sense circuitry 812 in FIG. 10). Additionally, the capacitor $C_B$ is a passive analog filtering component that averages the sampled force signals over the entire frame scanning period T1.

In some embodiments, a delay period 908 before each subscan operation 900 may not adversely affect the signal-to-noise ratio (SNR) when the RC time ($R_{SENSE}*C_B$; see FIG. 8) is of a sufficient length. The noise can be averaged after filtering from the capacitor $C_B$ when multiple subscan operations are performed with delay periods between the subscan operations.

Additionally or alternatively, other embodiments can employ different techniques for reducing or eliminating Johnson noise. For example, in one embodiment the value of $R_{SENSE}$ in FIG. 8 can be decreased. The signals $\backslash T_{REF\_TOP}$ and $\backslash T_{REF\_BOT}$ may be increased. And the capacitance value for $C_B$ can be increased. One or more of these different techniques can be used in place of bias flipping. Alternatively, one or more of these different techniques can be used in combination with bias flipping.

System Noise

System noise can be created by circuits and components in the electronic device. As one example, noise from a power supply or coupling noise can produce system noise. Some or all of the system noise may be injected into the force signals when the force signals are sampled. Bias flipping can be used in some embodiments to cancel or reduce the system noise, such as low frequency system noise. As shown in FIG. 9, the signal level for $V_{REF\_TOP}$ and $V_{REF\_BOT}$ can alternately switch from a first level (e.g., high level) to a second level (e.g., low level) during the frame time period T1. As described earlier, the signals $V_{REF\_TOP}$ and $V_{REF\_BOT}$ are received at nodes 804 and 806 in FIG. 8. Switching or flipping the signal levels can differentiate out the low frequency voltage noise.

The timing of when the bias switching occurs can depend on the type of noise being cancelled. To cancel system noise, the signal levels switch in between subscan operations 900 in the illustrated embodiment. Other embodiments can switch the signal levels differently. For example, the signal levels can switch on a frame-to-frame basis.

Additionally or alternatively, bias flipping can be used to reduce or cancel other types of magnetically and electrostatically coupled noise. As one example, the Seebeck effect is noise produced by micro-temperature fluctuations at the contact locations of different types of metals or conductors. Bias flipping can reduce or cancel the noise produced by the Seebeck effect.

Figure 10:
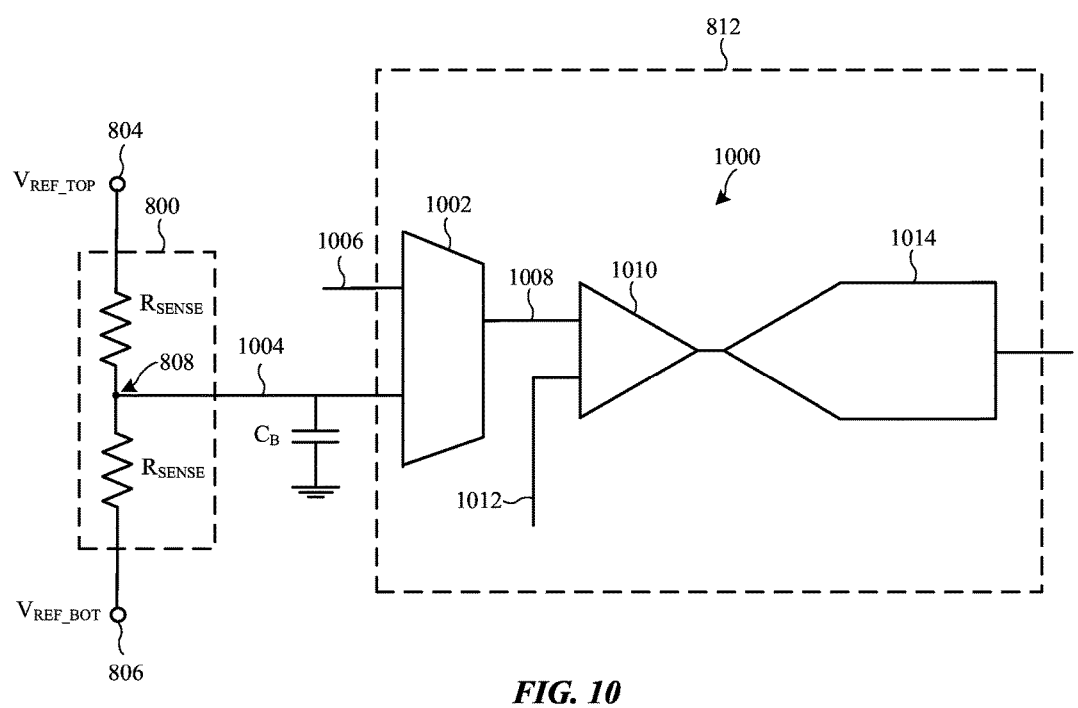
FIG. 10 is a simplified block diagram of the strain sensing element 800 operatively connected to a portion of the sense circuitry 812 shown in FIG. 8.

Referring now to FIG. 10, there is shown a simplified block diagram of a strain sensing element 800 operatively connected to a portion of the sense circuitry 812 shown in FIG. 8. The force signal at node 808 is received by a multiplexer 1002 on signal line 1004. The multiplexer 1002 also receives force signals from other strain sensing elements on one or more additional signal lines 1006. A force signal output from the multiplexer 1002 on signal line 1008 is received by an amplifier circuit 1010. The reference signal from the reference voltage divider (see 802 in FIG. 8) is received by the amplifier circuit 1010 on signal line 1012. As one example, the amplifier circuit 1010 may be a differential programmable gain amplifier. The differential programmable gain amplifier amplifies the difference between the force and reference signals received on signal lines 1008 and 1012, respectively.

An output signal from the amplifier circuit 1010 is received by an analog-to-digital converter (ADC) 1014. The ADC converts the analog output signal to a digital output signal. The digital output signal may then be processed further to correlate the digital signal to an amount of force applied to an input region (e.g., cover glass 601).

The sense circuitry can be configured as multiple channels with each channel receiving force signals from two or more strain sensing elements. The number of channels may be determined, at least in part, by the number of multiplexers and the number of ADCs that will be included in the system. For example, in one embodiment a system can include eight channels with the sense circuitry including four M:1 multiplexers and eight ADCs. Alternatively, in another embodiment a system may include four channels with the sense circuitry including eight M:1 multiplexers and four ADCs.

Display Line Refresh Noise

In one embodiment, the ADC 1014 is a sigma delta ADC. The sigma delta ADC can be configured to reduce or eliminate the display line refresh noise. Since the frequencies of the display line refresh noise can be determined, a transfer function may be selected to reduce or eliminate the display line refresh noise. In particular, the decimation filter in the sigma delta converter can filter out the display line refresh noise. The decimation filter attenuates high frequency noise. Thus, the length and shaping (i.e., weights) of the decimation filter used for analog-to-digital conversion is selected to produce sufficient attenuation at the frequency of the display line refresh noise. When the noise is at a high frequency, such as with the display noise or other system interference noise, the decimation filter can filter this noise out within a subscan operation. The frequencies of the filter notches and overall attenuation profile of the overall filter (including subscan averaging filter, decimation filter, and analog filtering in the system) can be strategically designed based on the frequency or frequencies of the noise.

Those skilled in the art will recognize that other embodiments are not limited to a sigma delta ADC. A separate filter circuit can be used in combination with an ADC to filter out the display line refresh noise. Additionally or alternatively, the sense circuitry may not include the multiplexer 1002 in another embodiment. The force and reference signals can be input directly into the amplifier circuit 1010. In such an embodiment, sensor matching or active temperature compensation may be needed.

Figure 11:
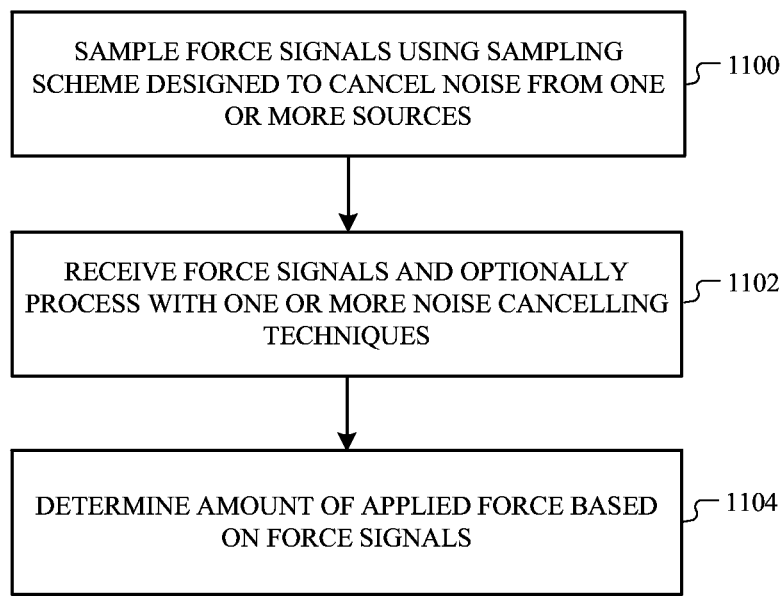
FIG. 11 is a flowchart of a method of cancelling noise in force signals produced by a strain sensitive structure.

Referring now to FIG. 11, there is shown a flowchart of a method of cancelling noise in force signals that are produced by a strain sensitive structure. Initially, as shown in block 1100, the force signals are sampled using a sampling scheme that reduces or cancels out noise in the force signals. The timing of the sampling scheme can be designed to cancel out noise that is produced by one or more sources. As described earlier, the timing of the sampling scheme can cancel or reduce touch to display handoff noise, Johnson noise, background noise, system noise, and/or display line refresh noise.

After the force signals have been sampled according to the desired sampling scheme at block 1100, the force signals can be processed further with one or more noise cancelling techniques to reduce or cancel noise (block 1102). As one example, a bucking technique can be used to cancel noise in the force signals. As another example, adaptive filtering may be used to reduce or eliminate noise in the force signals. Next, as shown in block 1104, the amount of force that was applied to an input region is determined based on the force signals.

As described earlier, the sampling scheme disclosed herein can be used to reduce the amount of noise injected into force signals by one or more sources. The techniques may be used individually or in various combinations. In one example, the delay periods between subscan operations can be aligned with system interferences in combination with bias flipping to reduce both touch-to-display handoff noise and system noise. In another example, the delay periods and the time period $t_1$ between subscan pairs (the time period between every other subscan operation) can be selected to reduce system and background noise. Additionally or alternatively, in this example the time period $t_2$ may be used to reduce background noise produced at a different frequency. In yet another example, all of the techniques can be employed together to reduce noise from multiple sources.

Various embodiments have been described in detail with particular reference to certain features thereof, but it will be understood that variations and modifications can be effected within the spirit and scope of the disclosure. For example, a device other than a touch sensing device and/or a force sensing device can share at least a portion of the display area. By way of example only, a fingerprint sensor can use at least a portion of the top surface of the display as an input region.

Even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. A method of operating a force sensing device incorporated with a display of an electronic device, the method comprising:
    dividing a scanning period for a frame of the display into a plurality of sub scan time periods; and
    within each sub scan time period, sampling force signals only during a scan period and not sampling force signals during a delay period, wherein the scan and delay periods are offset from one another within a sub scan time period: wherein:
    a time period between the scan periods in only every other sub scan time period is set to a value that reduces background noise in the force signals.

2. The method as in claim 1, wherein a signal instability produced by a VCOM signal transitioning between high and low signal levels occurs only during the delay period.

3. The method as in claim 1, wherein a signal instability produced by a VCOM signal transitioning between high and low signal levels partially overlaps with the scan period.

4. The method as in claim 1, wherein the background noise is produced by A/C power.

5. The method as in claim 1, further comprising switching reference voltages received by one or more strain sensing elements in the force sensing device between subscan time periods.

6. An electronic device, comprising: a display stack for a display, comprising:
    a cover glass; and
    a strain sensing structure positioned below the cover glass, the strain sensing structure comprising a substrate, a first set of strain sensitive films positioned on a first surface of the substrate, and a second set of strain sensitive films positioned on a second surface of the substrate and aligned vertically with the first set of strain sensitive films, wherein a strain sensitive film in the first set and a vertically aligned strain sensing film in the second set together form a strain sensing element; wherein a strain sensitive film in the first set and a vertically aligned strain sensing film in the second set together from a strain sensing element;
    sense circuitry operably connected to each strain sensing element; and
    a controller operably connected to the sense circuitry and configured to cause force signals to be sampled from one or more strain sensing elements multiple times during a frame scanning period of the display, wherein the force signals are sampled only during multiple scan periods in the frame scanning period and the scan periods are offset from one another by a delay period:
    wherein:
a time period between only every other scan period is set to a value that reduces background noise in the force signals.

7. The electronic device as in claim 6, wherein the background noise is produced by A/C power.

8. The electronic device as in claim 6, wherein the display stack further comprises a display layer and a VCOM buffer layer and a signal instability produced by a VCOM signal transitioning between high and low signal levels occurs only during the delay periods.

9. The electronic device as in claim 6, wherein the controller is configured to switch reference voltages received by each strain sensing element in the strain sensing structure between scan periods.

10. The electronic device as in claim 6, wherein the sense circuitry comprises a sigma delta analog-to-digital converter.

11. The electronic device as in claim 10, wherein a size of a step for one analog-to-digital conversion is selected to produce sufficient attenuation at a display line refresh noise frequency.

12. A method of operating a force sensing device incorporated with a display of an electronic device, wherein the force sensing device comprises a strain sensing element, the method comprising:
    dividing a scanning period for a frame of the display into a plurality of sub scan time periods:

within each sub scan time period, sampling force signals only during a scan period and not sampling force signals during a delay period, wherein the scan and delay periods are offset from one another within each sub scan time period: and flipping a first reference voltage and a second reference voltage between first and second nodes of the strain sensing element when a force signal not sampled from the strain sensing element: wherein:

a time period between the scan periods in only every other sub scan time period Is set to a value that reduces background noise in the force signals.

13. The method as in claim 12, wherein the reference voltages are flipped during the delay periods.

14. The method as in claim 12, wherein a signal instability produced by a VCOM signal in the display transitioning between high and low signal levels occurs only during the delay period.

15. The method as in claim 12, wherein the background noise is produced by A/C power.

16. A method of operating a force sensing device incorporated with a display of an electronic device, wherein the force sensing device comprises a strain sensing element, the method comprising:

sampling a force signal from the strain sensing element during a scan period in at least one sub scan time period, wherein a plurality of sub scan time periods occur during a scanning period for a frame of the display and the scan period is offset from a signal instability produced by a VCOM signal in the display transitioning between two signal levels: wherein:

a time period between the scan periods in only every other sub scan time period is set to a value that reduces background noise in the force signals.

17. The method as in claim 16, further comprising flipping a first reference voltage and a second reference voltage between first and second nodes of the strain sensing element when the force signal not sampled from the strain sensitive element.

* * * * *